United States Patent [19]
Andersson

[11] 3,800,739
[45] Apr. 2, 1974

[54] FEED SAVER FOR A POULTRY EGG LAYING BATTERY

[76] Inventor: Hakan Andersson, Kvarnliden 4, 532 00 Skara, Sweden

[22] Filed: July 7, 1972

[21] Appl. No.: 269,806

[52] U.S. Cl..................................... 119/18, 119/61
[51] Int. Cl...................... A01k 31/18, A01k 39/00
[58] Field of Search................ 119/18, 19, 52 R, 61

[56] References Cited
UNITED STATES PATENTS

| | | | |
|---|---|---|---|
| 3,593,689 | 7/1971 | Van Huis | 119/18 |
| 3,492,971 | 2/1970 | Keen et al. | 119/18 |
| 1,864,569 | 6/1932 | Willauer | 119/61 |
| 1,829,682 | 10/1931 | Speicher | 119/52 R |
| 3,543,283 | 11/1970 | Cataline | 119/61 |
| 3,611,995 | 10/1971 | Murto | 119/18 |

Primary Examiner—Louis G. Mancene
Assistant Examiner—James H. Czerwonky
Attorney, Agent, or Firm—Holman & Stern

[57] ABSTRACT

A poultry laying battery is provided with a snap fit feed trough of generally U-shaped cross section extending along the front side of the battery. In order to prevent the birds scattering the feed, the side wall of the trough extending parallel to the front side of the battery is provided with a flange, slightly inclined downwards. An extension of the side wall is provided above said flange, with this extension being displaced away from the side wall by a distance substantially corresponding to the thickness of a bar forming a main component of the front side cage structure.

3 Claims, 3 Drawing Figures

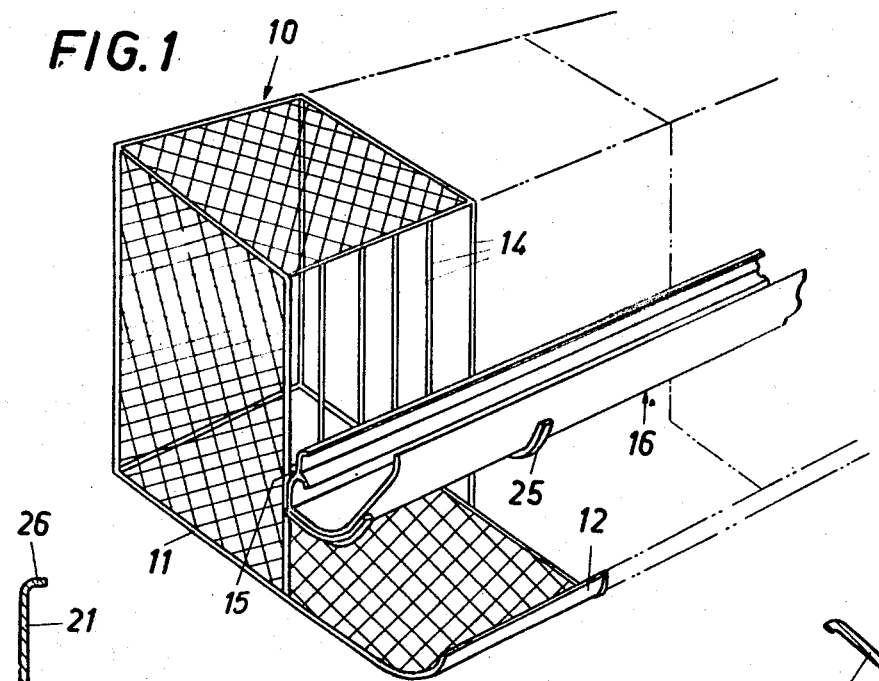
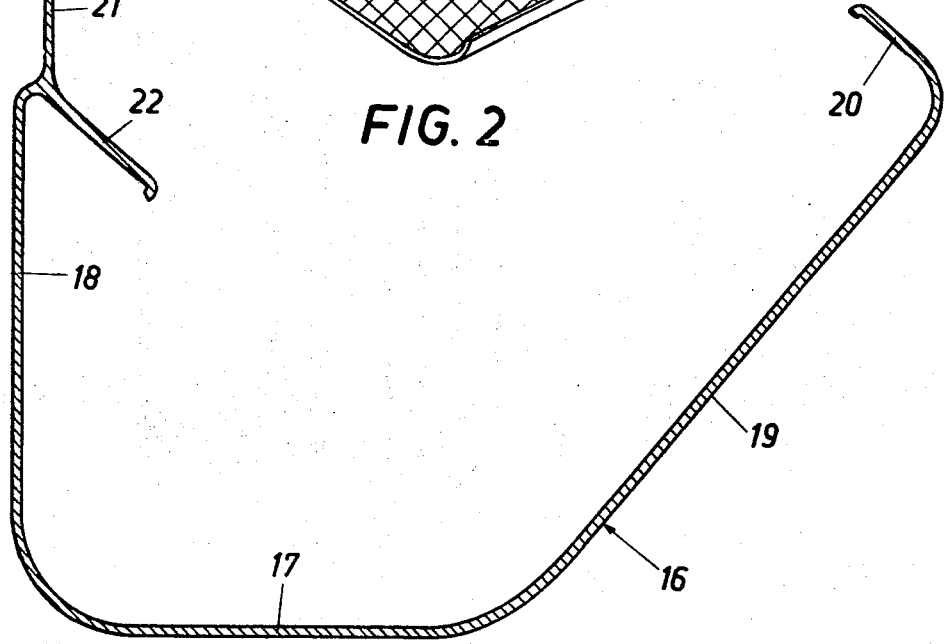

FEED SAVER FOR A POULTRY EGG LAYING BATTERY

BACKGROUND OF THE INVENTION

The present invention relates to a feed saving arrangement for poultry egg laying batteries of the type in which a number of cages for individual birds are arranged in a row. A feeding trough for such a battery has a generally U-shaped crosssection and extends along the front side of the cages, each of which is provided with at least one opening making the trough accessible for the fowl. One side wall of the trough is attached to the lower portion of the front sides of the cages.

It lies within the nature of birds to kick and scatter the feed when they are feeding. When birds are enclosed in laying cages they can reach the feed by their heads only, but nevertheless a considerable portion of the feed is lost by the birds pecking into the trough.

It has been proposed to provide flanges at the longitudinal edges of the trough and in this manner a certain saving has been possible, but still an important portion, say about 10 percent of the ration, will be lost.

SUMMARY OF THE INVENTION

According to the invention it is now proposed to provide the front side of each cage with a horizontal bar forming the lower support for a number of vertical rods constituting the main portion of the front side and defining therebetween openings making the feed trough available for the birds. Means are further provided for securing the trough to the front side, with the flange of the side wall of the trough adjacent to the battery below said bar, and an extension of the one side wall extends above the flange and is displaced away from the front side by a distance corresponding to the thickness of the bar.

In this manner the possibilities of the birds scattering the feed will be limited, while the feed is fully available, and a noticeable saving will be reached.

BRIEF DESCRIPTION OF THE DRAWINGS

FIG. 1 illustrates schematically a portion of a poultry laying battery,

FIG. 2 is a view in cross section through a feed trough according to one embodiment of the invention.

DETAILED DESCRIPTION OF THE PREFERRED EMBODIMENTS

Figure 3:
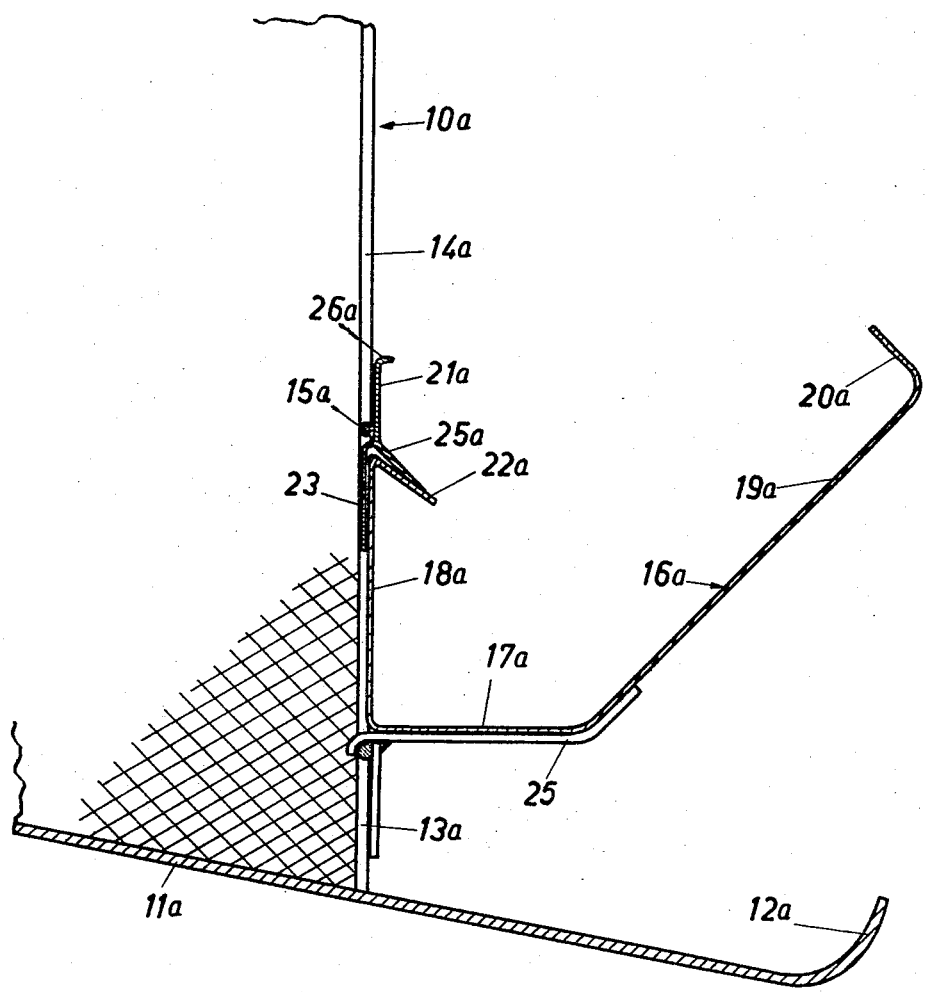
FIG. 3 is a view partly in elevation and partly in cross-section of a modified embodiment of the trough, as mounted on a cage.

Each cage 10 has a generally parallelepipedic form with side walls of wire mesh or boards and with a bottom 11 of wire mesh. This bottom extends beyond the front side of the cage and is inclined downwards in the direction of the front side. It is terminated by a rounded edge portion 12 designed to catch the eggs laid by the birds, and which roll forwards through an opening 13 in the lower portion of the front side of the cage. A number of such cages are built together in a line to form a battery of suitable size.

The main portion of the front side of each cage is formed by a number of vertical rods 14, the upper ends of which are attached to the top portion, or lid of the cage. The lower ends of the rods 14 are attached to a horizontal bar 15 extending across the front side of the cage. The distance between the rods 14 is such that a bird, for which the cage is suited, may extend its head and neck between any two rods to reach the feed distributed into a trough 16 fitted along the cages, below the horizontal bars 15 and being carried by a number of brackets 25 attached to the battery front below the bars 15. In the embodiment according to FIGS. 1 and 2, this trough will define the egg passage opening 13 upwards.

A cross section of the trough is shown in FIG. 2. The trough 16 may be made of metal or plastic and consists of a bottom portion 17 and two side walls 18 and 19, respectively. The bottom portion 17 is substantially planar, and the side wall 18, intended to be turned towards the battery is arranged perpendicularly thereto. The other side wall 19 is inclined away from the first side wall and is terminated by an inwardly turned, yet upwardly directed flange 20.

The first mentioned side wall 10 is also provided with an inwardly turned flange 22, which is inclined slightly downwards and is located somewhat below flange 20. This side wall is extended above flange 22 by an upwardly directed portion 21, the upper edge of which presents a smoothly rounded face towards the cage, as indicated at 26.

To reach the feed provided in the trough defined by the bottom 17 and the side walls 18 and 19, the bird must pass its head beyond the extended portion 21 and the flange 22. The scattering movements possible are small, and particles of the feed thrown around will be caught by portions 20, 22 and 21, 26 and deflected back to the trough.

To make possible an easy fastening in a suitable position, the extended portion 21 is displaced away from the front side of the cage by a distance corresponding to the thickness of the bar 15. The trough may then be snapped in place between the bar and the brackets 25. The rounded face 26 will furthermore be located in a more advantageous position to prevent scattering while making it easier for the bird to reach the feed.

Water may be supplied to the cages in any suitable manner, for instance by way of a second trough (not shown).

With cages provided with a feed trough of conventional design the attachment according to FIG. 3 may be utilized.

This trough consists of a bottom portion 17a and two side walls 18a and 19a, each provided with an inturned flange 22a and 20a, respectively. The attachment to be fitted to side wall 18a is designed as a three armed fillet suited to be fitted between the bar 15a and wall 18a with its flange 22a. This fillet comprises a first flange 23 intended to be fitted between the cage and side wall 18a, a second flange 21a, which in the same manner as extension 21 of the first embodiment extends upwards and is displaced away from the front side of the cage, as well as a third flange 25a resting on the flange 22a, whereby they together form a downwardly inclined structure. Also in this embodiment the flange 21a is provided with a rounded edge 26a. This attachment will provide the same feed saving properties at a trough of conventional design, as does the embodiment according to FIGS. 1 and 2.

What I claim is:

1. A feed saver for a poultry egg laying battery comprising a number of cages arranged in a row, each cage being designed to accommodate a single bird and having a front side provided with a feeding opening and a feeding trough outside and below said feeding opening, said trough having a generally U-shaped cross section with one side wall adapted to be fitted parallel to the front side of the battery and being further provided with an internal downwardly extending flange structure turned towards the opposite side wall of the trough, the improvement including a horizontal bar mounted on said battery and extending across the front side of each cage to form a lower support for a number of vertical rods constituting the main portion of the front side of each cage and dividing the feeding opening into a number of passages, each permitting a bird enclosed in the cage to extend its head and neck therethrough, means mounted on said battery for securing the said one side wall of the trough to the battery so said flange structure is located below said bar, the outer end of said flange structure having a bearing surface to permit the releasable snap-fit mounting of said trough between said horizontal bar and said securing means, and an extension of said one side wall of the trough extending above said flange and being displaced away from the front side of the cage by a distance corresponding to the thickness of said bar.

2. The feed saver according to claim 1 in which the flange structure and the extension are formed as a separate, three armed fillet, having a first arm for fitting between the front side of the battery and the one side wall of the trough, a second arm providing the displaced extension of the one side wall, and a third arm defining together with an inturned portion of the one side wall said downwardly extending flange structure.

3. The feed saver according to claim 1 in which said extension has a free edge, and the free edge of the extension being turned inwards with respect to the trough and presenting a rounded surface towards the cage serving to deflect any thrown seed back into the trough.

* * * * *